United States Patent
Grams et al.

(10) Patent No.: US 9,779,068 B2
(45) Date of Patent: Oct. 3, 2017

(54) METHOD FOR ASSOCIATING FIXED AND FLEXIBLE LAYOUT MODES FOR READING DOCUMENTS

(71) Applicant: Konica Minolta Laboratory U.S.A., Inc., San Mateo, CA (US)

(72) Inventors: Jason Grams, Westminster, CO (US); Stuart Guarnieri, Laramie, WY (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 247 days.

(21) Appl. No.: 14/634,293

(22) Filed: Feb. 27, 2015

(65) Prior Publication Data
US 2016/0253289 A1 Sep. 1, 2016

(51) Int. Cl.
G06F 17/24 (2006.01)
G06F 17/22 (2006.01)
G06F 17/21 (2006.01)
G06F 17/25 (2006.01)

(52) U.S. Cl.
CPC ........ G06F 17/2247 (2013.01); G06F 17/211 (2013.01); G06F 17/227 (2013.01)

(58) Field of Classification Search
CPC .................................................. G06F 17/212
See application file for complete search history.

(56) References Cited

U.S. PATENT DOCUMENTS

| | | | |
|---|---|---|---|
| 6,704,034 B1 | 3/2004 | Rodriguez et al. | |
| 8,539,342 B1* | 9/2013 | Lewis | G06F 17/212 715/243 |
| 2006/0224952 A1* | 10/2006 | Lin | G06F 17/2247 715/209 |
| 2006/0227153 A1 | 10/2006 | Anwar et al. | |
| 2007/0208996 A1 | 9/2007 | Berkner et al. | |
| 2010/0275152 A1 | 10/2010 | Atkins et al. | |
| 2010/0332973 A1 | 12/2010 | Kloiber et al. | |
| 2012/0084640 A1* | 4/2012 | Grams | G06F 17/217 715/235 |
| 2013/0007592 A1* | 1/2013 | Dougherty | G06T 11/60 715/234 |

(Continued)

FOREIGN PATENT DOCUMENTS

| | | |
|---|---|---|
| EP | 1710748 A2 | 10/2006 |
| JP | 2014174709 A | 9/2014 |
| JP | 2014211747 A | 11/2014 |

Primary Examiner — James J Debrow
(74) Attorney, Agent, or Firm — Osha Liang LLP (57) ABSTRACT

A method for generating electronic documents (EDs) includes reading an input ED from storage, specifying in the input ED a predetermined element that defines a region comprising a content, storing the content in connection with the predetermined element, generating a fixed-layout ED having a fixed layout and comprising a content corresponding to the content of the input ED, generating a flexible-layout ED having a flexible layout and comprising a content corresponding to the content of the input ED, linking the content of the fixed-layout ED to a position of the content of the flexible-layout ED, linking the content of the flexible-layout ED to a position of the content of the fixed-layout ED, and outputting one or both of the fixed-layout ED and the flexible-layout ED to a user device.

20 Claims, 12 Drawing Sheets

(56) References Cited

U.S. PATENT DOCUMENTS

2013/0262991 A1* 10/2013 Donahue ............ G06Q 30/0251
715/252
2015/0248378 A1* 9/2015 Nordback ............. G06F 17/212
715/243

* cited by examiner

Markup of ED 420

```
<w:p w:rsidR="003B731D" w:rsidRDefault="007338DA">
<w:bookmarkStart w:id="0" w:name="_GoBack"/>
<w:bookmarkEnd w:id="0"/>
<w:r>
<w:t>This is paragraph 1.</w:t>
</w:r>
<w:r w:rsidR="009F2801">
<w:t xml:space="preserve"> This is a test document. </w:t>
</w:r>
</w:p>

<w:p w:rsidR="007338DA" w:rsidRDefault="007338DA" w:rsidP="007338DA">
...
<w:drawing>
<wp:inline distT="0" distB="0" distL="0" distR="0" wp14:anchorId="59D10F40" wp14:editId="4442EA02">
<wp:extent cx="5943600" cy="4457700"/>
<wp:effectExtent l="0" t="0" r="0" b="0"/>
<wp:docPr id="1" name="Picture 1"/>
...
<pic:cNvPr id="1" name="Penguins.jpg"/>
...
</wp:inline>
</w:drawing>
</w:r>
</w:p>

<w:p w:rsidR="007338DA" w:rsidRDefault="007338DA" w:rsidP="007338DA">
...
<w:t xml:space="preserve">Figure – 1This is a picture of penguins.</w:t>
...
</w:p>

<w:p w:rsidR="007338DA" w:rsidRPr="007338DA" w:rsidRDefault="009F2801" w:rsidP="007338DA">
...
<w:t xml:space="preserve">This is paragraph 2 of the test document. Ipsum Lorem et squigglum.</w:t>
...
</w:p>
```

Markup of Fixed-layout ED 520

```
<?xml version="1.0" encoding="UTF-8" standalone="no"?>
...
<svg>
    <a
       xlink:href="#"
       onclick="RedirectURLPara(1,1);return false;"
       id="page_1_para_1"
       transform="translate(-36.58786,-23.717457)">
       <text xml:space="preserve">
         <tspan class="ffss rsf00000001" x="150" y="172.229" font-family="Calibri"
  textLength="421" lengthAdjust="spacingAndGlyphs">This is paragraph 1. This is a test
  document. </tspan>
       </text>
    </a>
    <a
       xlink:href="#"
       onclick="RedirectURLPara(1,2);return false;"
       id="page_1_para_2"
       transform="translate(-36.58786,-23.717457)">
       <text xml:space="preserve">
       </text>
    </a>
    <a
       xlink:href="#"
       onclick="RedirectURLItem(1,1);return false;"
       id="page_1_item_1"
       transform="translate(-36.58786,-23.717457)">
       <svg x="00150" y="00197" width="00975px" height="00731px">
         <image x="00000" y="00000" width="00975" height="00731" xlink:href="../images/
  img_1_1.png"/>
         <g transform="translate(-000150 -000197)">
         </g>
       </svg>
    </a>
    <a
       xlink:href="#"
       onclick="RedirectURLPara(1,2);return false;"
       id="page_1_para_2"
       transform="translate(-36.58786,-23.717457)">
       <text xml:space="preserve">
       </text>
    </a>
    <a
       xlink:href="#"
       onclick="RedirectURLPara(1,3);return false;"
       id="page_1_para_3"
       transform="translate(-36.58786,-23.717457)">
       <text xml:space="preserve">
         <tspan class="ffss rsf00000002" x="150" y="965.156" font-family="Calibri"
  textLength="280" lengthAdjust="spacingAndGlyphs">Figure - 1 This is a picture of penguins.</
  tspan>
       </text>
    </a>
......
```

Markup of Flexible-layout ED 620

<!DOCTYPE html>
...
<body lang="EN-US" style="tab-interval:.5in">
...
<script type="text/javascript" xlink:href="../js/flexible.js"></script>

```
<a href="#" id="page_1_para_1" onclick="RedirectURLPara(1,1); return false;">
<p class="ps00000001">
<span class="ffss rs00000001" font-family="Calibri">This is paragraph 1.
 This is a test document. </span>
</p>
</a>
```
— 621

```
<a href="#" id="page_1_para_2" onclick="RedirectURLPara(1,2); return false;">
<p class="ps00000002">
</p>
</a>
```
— 622

```
<a href="#" id="page_1_para_3" onclick="RedirectURLPara(1,3); return false;">
<p class="ps00000003">
<span class="ffss rs00000002" font-family="Calibri">Figure - 1This is a
 picture of penguins.</span>
</p>
</a>
```
— 623

```
<a href="#" id="page_1_para_4" onclick="RedirectURLPara(1,4); return false;">
<p class="ps00000001">
<span class="ffss rs00000001" font-family="Calibri">This is paragraph 2
 of the test document. Ipsum Lorem et squigglum.</span>
</p>
</a>
```
— 624

```
<a href="#" id="page_1_item_1" onclick="RedirectURLItem(1,1); return false;">
<p class="ps00000002">
<svg viewbox="0 0 00975 00731" style="width:06.5000in; height:auto; vertical-
align:middle; max-width:100%; max-height:04.8733in; ">
<image x="00000" y="00000" width="00975" height="00731" xlink:href="../images/
img_1_1.png"/>
<g transform="translate(-000150 -000197)">
</g>
</svg>
</p>
</a>
```
— 625

</body>
</html>

FIG. 6B

```
function RedirectURLPara(page_num, para_num)
{
  var outURL = "flexible.html" + "#page_"+page_num + "_para_" + para_num;
  window.open(outURL, "iframe_form");
}
```

FIG. 7

```
function RedirectURLItem(page_num, item_num)
{
  var outURL = "flexible.html" +"#page_num"+page_num + "_item_" + item_num + ".html";
  window.open(outURL, "iframe_form");
}
```

FIG. 8

```
function RedirectURLPara(page_num, para_num)
{
  var outURL = "fixed.html" + "#page_"+page_num + "_para_" + para_num;
  window.open(outURL, "iframe_form");
}
```

FIG. 9

```
function RedirectURLItem(page_num, item_num)
{
  var outURL = "fixed.html" +"#page"+page_num + "_item_" + item_num + ".html";
  window.open(outURL, "iframe_form");
}
```

METHOD FOR ASSOCIATING FIXED AND FLEXIBLE LAYOUT MODES FOR READING DOCUMENTS

BACKGROUND

Electronic documents (EDs) are commonly used for storing and disseminating information. There are various language to describe the EDs such as Office Open XML (OOXML), OpenDocument Format (ODF), Portable Document Format (PDF), or the like. For example, in an XML-based format like OOXML and ODF, a set of markup elements is defined in the ED, and each of the markup elements defines the content and the position in the ED.

On the other hand, some display layouts are known for displaying an original ED in a different arrangement. Examples of the display layouts are fixed-layout and flexible-layout (reflowable-layout). In the fixed-layout, content of the original ED, which includes a text, a drawing, a table or the like, is arranged according to the original ED. Thus, depending on the screen size of a device, the fixed file format may require either the content to be very small/big, or to be zoomed in/out to the point where panning horizontally is needed in order to read the content.

In the flexible layout mode, the arrangement of the content can be changed from the original one on a user device. In general, such a user device may be a smart phone or a tablet. In the flexile layout mode, for example, the content is displayed so that size of the content fits the screen size and user configuration. This layout mode may solve the inconveniency. However, the re-arrangement may affect fidelity of the original content created by a designer/writer.

SUMMARY

In general, in one aspect, the invention relates to a method for generating electronic documents (EDs), comprising: reading an input ED from storage; specifying in the input ED a predetermined element that defines a region comprising a content; storing the content in connection with the predetermined element; generating a fixed-layout ED having a fixed layout and comprising a content corresponding to the content of the input ED; generating a flexible-layout ED having a flexible layout and comprising a content corresponding to the content of the input ED; linking the content of the fixed-layout ED to a position of the content of the flexible-layout ED; linking the content of the flexible-layout ED to a position of the content of the fixed-layout ED; and outputting one or both of the fixed-layout ED and the flexible-layout ED to a user device.

In general, in another aspect, the invention relates to a system for generating electronic documents (EDs), comprising: a parser that: specifies a predetermined element that defines a region in an input ED read from storage; and stores a content included in the region in connection with the predetermined element; and a generator that: generates a fixed-layout ED having a fixed layout and comprising a content corresponding to the content of the input ED; generates a flexible-layout ED having a flexible layout and comprising a content corresponding to the content of the input ED; links the content of the fixed-layout ED to a position of the content of the flexible-layout ED; and links the content of the flexible-layout ED to a position of the content of the fixed-layout ED, wherein one or both of the fixed-layout ED and the flexible-layout ED are output to a user device.

In general, in another aspect, the invention relates to a non-transitory computer readable medium (CRM) storing instructions for generating electronic documents (EDs), the instructions comprising functionality for: reading an input ED from storage; specifying a predetermined element that defines a region in the input ED; storing a content included in the region in connection with the predetermined element; generating a fixed-layout ED having a fixed layout and comprising a content corresponding to the content of the input ED; generating a flexible-layout ED having a flexible layout and comprising a content corresponding to the content of the input ED; linking the content of the fixed-layout ED to a position of the content of the flexible-layout ED; linking the content of the flexible-layout ED to a position of the content of the fixed-layout ED; and outputting one or both of the fixed-layout ED and the flexible-layout ED to a user device.

Other aspects of the invention will be apparent from the following description and the appended claims.

BRIEF DESCRIPTION OF DRAWINGS

FIGS. 4A, 4B, 5A, 5B, 6A, and 6B show example EDs in accordance with one or more embodiments of the invention.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a system, and a non-transitory computer readable medium (CRM) for generating EDs. For example, the system may read an input ED, and specify a predetermined element (tag) that defines a display region of a content (e.g., a text, a drawing, a table, etc.) of the input ED. Next, the system may store the content included in the display region in connection with the predetermined element, and generate both a fixed-layout ED displayed in a fixed-layout and flexible-layout ED displayed in a flexible-layout. Each of the generated EDs includes the content derived from the input ED, and the content is linked to a position of the content in the other ED.

In one or more embodiments of the invention, the input ED may be defined using a document markup language. A document markup language can annotate the body text of an ED to provide, for example, formatting instructions. In one or more embodiments of the invention, the document markup language may be Extensible Markup Language (XML), which defines a set of rules for encoding documents in a format that is both human-readable and machine-readable. Examples of input ED file formats that use XML to annotate the body text of the ED include Office Open XML (OOXML) and Open Document Format (ODF), among others.

In one or more embodiments of the invention, the markup of the input ED may include tags that represent markup language instructions. A tag is inserted in the markup of the input ED to annotate a text, sentence, paragraph, drawing, or the like. Other tags may provide support for the tracking of changes and/or the insertion of footnotes, endnotes, headers and footers, linked text, watermarks, and/or other functionality provided by the markup language.

In one or more embodiments of the invention, the input ED may be defined using other document languages that have specific commands for describing a text, drawing, or the like. Examples of such a document language include, e.g., Portable Document Format (PDF) and PostScript.

In one or more embodiments of the invention, the generated EDs may be defined using another document markup language, such as HyperText Markup Language (HTML) suitable for displaying content of an ED with a web browsers executed by a user device. Like XML, HTML defines a set of rules for encoding documents in a format which is both human-readable and machine-readable.

In one or more embodiments of the invention, at least two types of EDs may be generated: a fixed-layout ED and a flexible-layout ED. The fixed-layout ED has a structure in which the contents are arranged in a fixed layout. The fixed-layout ED includes several Scalable Vector Graphics (SVG) commands for drawing vector-based graphics in an HTML or an XML file. The fixed-layout ED may form various contents such as text, paragraphs, and drawings arranged in a layout that is consistent with the original (input) ED. The fixed-layout ED allows for greater control of output appearance on the device.

On the other hand, the flexible-layout ED has a structure in which the contents are arranged in a flexible layout. The flexible-layout ED mainly includes typical HTML text commands. The flexible-layout ED allows for greater browser-based layout capability.

In one or more embodiments of the invention, both types of the generated EDs (fixed-layout and flexible-layout) include the same contents as the input ED. However, the system may insert the contents into both types of EDs in different layouts. In addition, the system may insert a hyperlink so that the same contents included in the EDs are mutually linked. As a result, a user of the device has discretion to switch between the two types of EDs as desired, thereby providing the user with a more convenient browsing experience of the original contents.

In one or more embodiments of the invention, the fixed-layout ED and the flexible-layout ED may be stored separately over a network such as the Internet. For example, one system may store one type of the generated EDs and another system may store the other type of the generated EDs. In this case, each link included in the generated EDs may include a fully qualified domain name of the system that hosts the ED.

Figure 1:
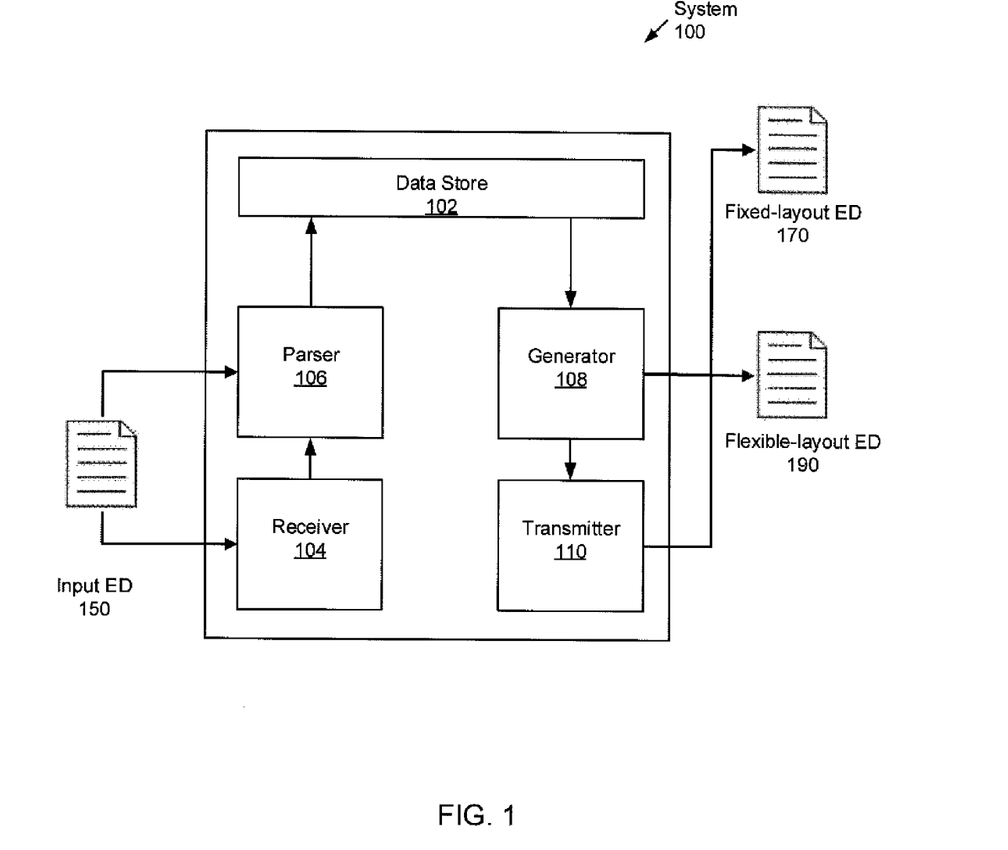
FIG. 1 shows a schematic diagram of a system in accordance with one or more embodiments of the invention.

FIG. 1 shows a system (100) in accordance with one or more embodiments of the invention. As shown in FIG. 1, the system (100) includes a data store (102), a receiver (104), a parser (106), a generator (108), and a transmitter (110). The system (100) may read an input ED from an internal storage or an external storage in a remote system, and output a fixed-layout ED and a flexible-layout ED in the storage. Each of these components (102)-(110) may be located on the same computing device (e.g., desktop computer, server, laptop computer, tablet computer, smart phone, etc.) or may be located on different computing devices connected by a network having wired and/or wireless segments. Further, one or more of these components (102)-(110) may be executed by one or more processors.

In one or more embodiments of the invention, the data store (102) may store one or more contents of the input ED in connection with a content type. The content type may be defined by an element such as a tag in an XML-based format. The data store (102) may store any data that has been processed and will be processed by one of the other aforementioned components.

In one or more embodiments of the invention, the receiver (104) may receive the input ED (150) from the external storage of a remote system via a network such as the Internet.

In one or more embodiments of the invention, the parser (106) may read and parse the input ED (150), and store contents of the input ED in connection with the predetermined element (or elements). For example, the parser (106) may specify an element such as a tag or a command that defines a display region for a content (e.g., a text, a paragraph, a drawing, etc.) of the input ED. Then, the parser (106) may store the content in the region on the data store (102) in connection with the element.

In one or more embodiments of the invention, the generator (108) may generate and output the fixed-layout ED (170) and the flexible-layout ED (190). For example, the generator (108) may load the contents with the content types (which as discussed above may be defined by an element such as a tag) stored in the data store (102), and assign element numbers to the contents with respect to each content type within a page. For example, if there are two paragraphs and two drawings in a page, the generator (108) may assign "1" and "2" to the paragraphs and the drawings, respectively. Each content may be identified by the element number and the page number.

In addition, the generator (108) may generate the fixed-layout ED (170) and the flexible-layout ED (190), and insert all of the contents into the generated EDs. In this process, the generator (108) may arrange the contents of the fixed-layout ED (170) mainly using SVG commands so that the arrangement of the contents is consistent with the input ED. On the other hand, the generator (108) may arrange the contents of the flexible-layout ED (190) using text HTML commands so that the arrangement of the contents is suitable for the screen of the device.

Furthermore, the generator (108) may set to each content of the fixed-layout ED (170) a link for the position of the same content of the flexible-layout ED (190). On the other hand, the generator (108) may set each content of the flexible-layout ED (190) a link for the position of the same content of the fixed-layout ED (170). The generator (108) may store the generated EDs on the internal storage of the system (100) or the external storage of a remote system.

In one or more embodiments of the invention, the transmitter (110) may send the generated EDs (i.e., the fixed-layout ED and the flexible-layout ED) to the device responding to a request from the device for either or both of the generated EDs.

While FIG. 1 shows one particular configuration of components for illustration purposes, other configuration may be used without departing from the scope of the invention. For example, various components may be combined to form a single component. As another example, the functionality performed by a single component may be performed by two or more components.

Figure 2:
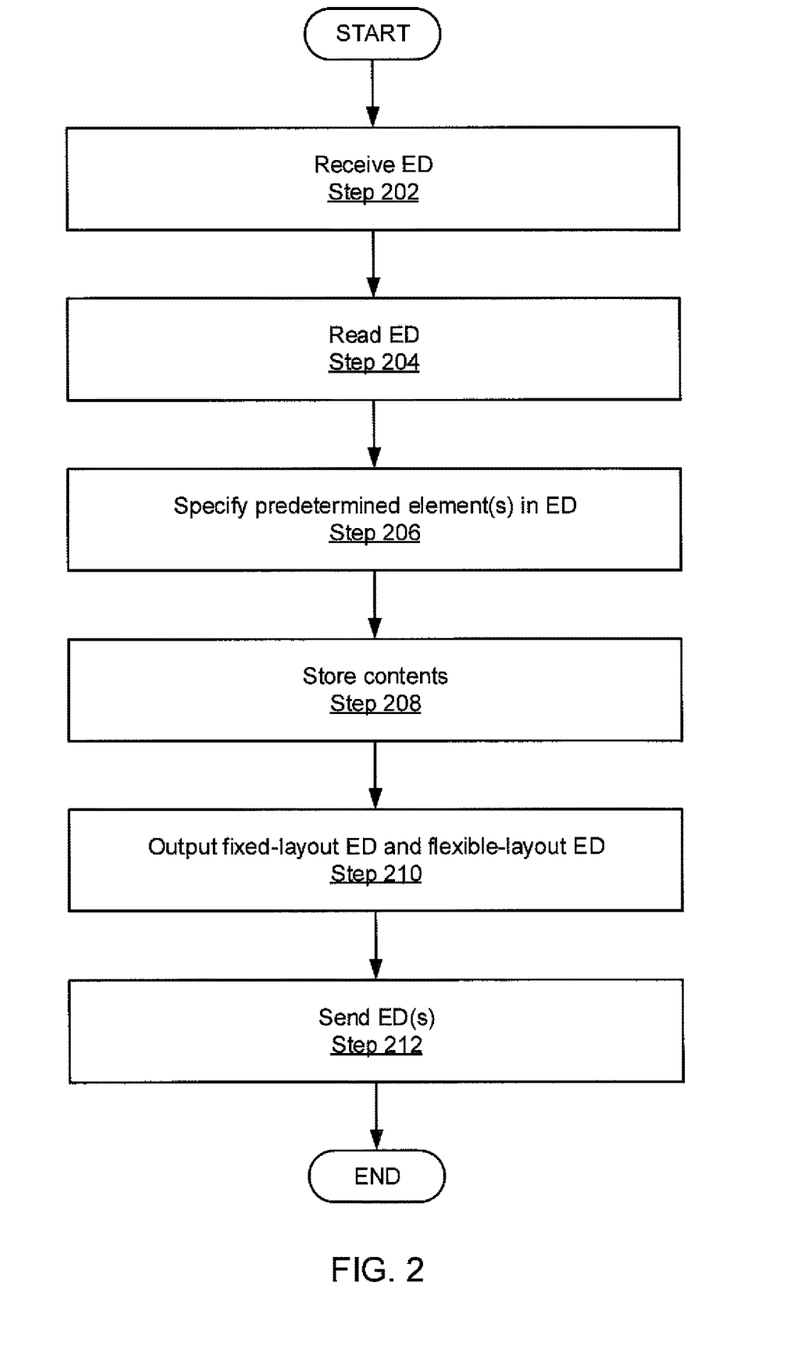
FIG. 2 shows a flowchart in accordance with one or more embodiments of the invention.

FIG. 2 shows a flowchart in accordance with one or more embodiments of the invention. The process depicted in FIG. 2 may be used to output a fixed-layout document and a flexible-layout document. One or more of the steps in FIG. 2 may be performed by the components of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Figure 4A:
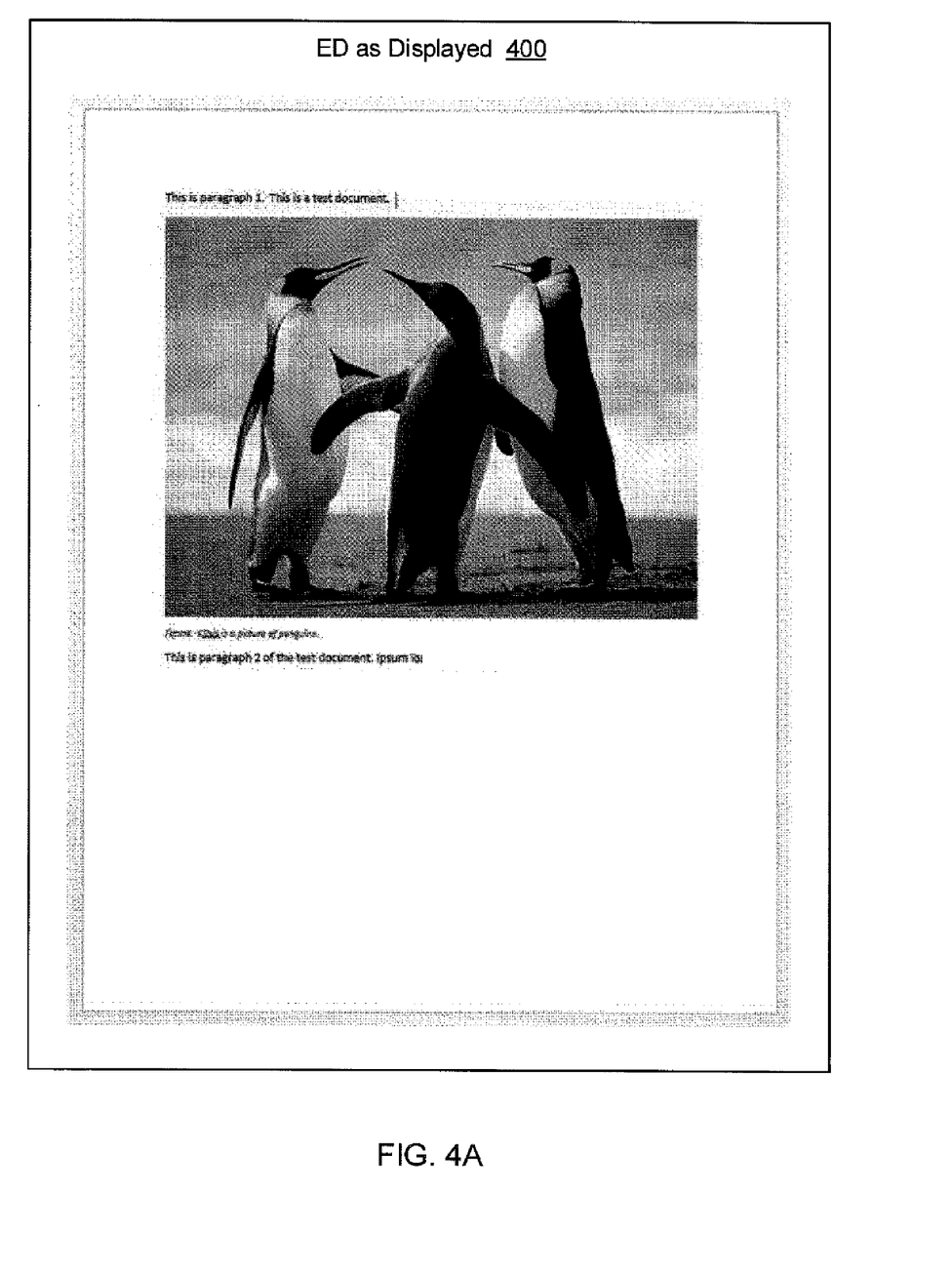
Figure 4B:
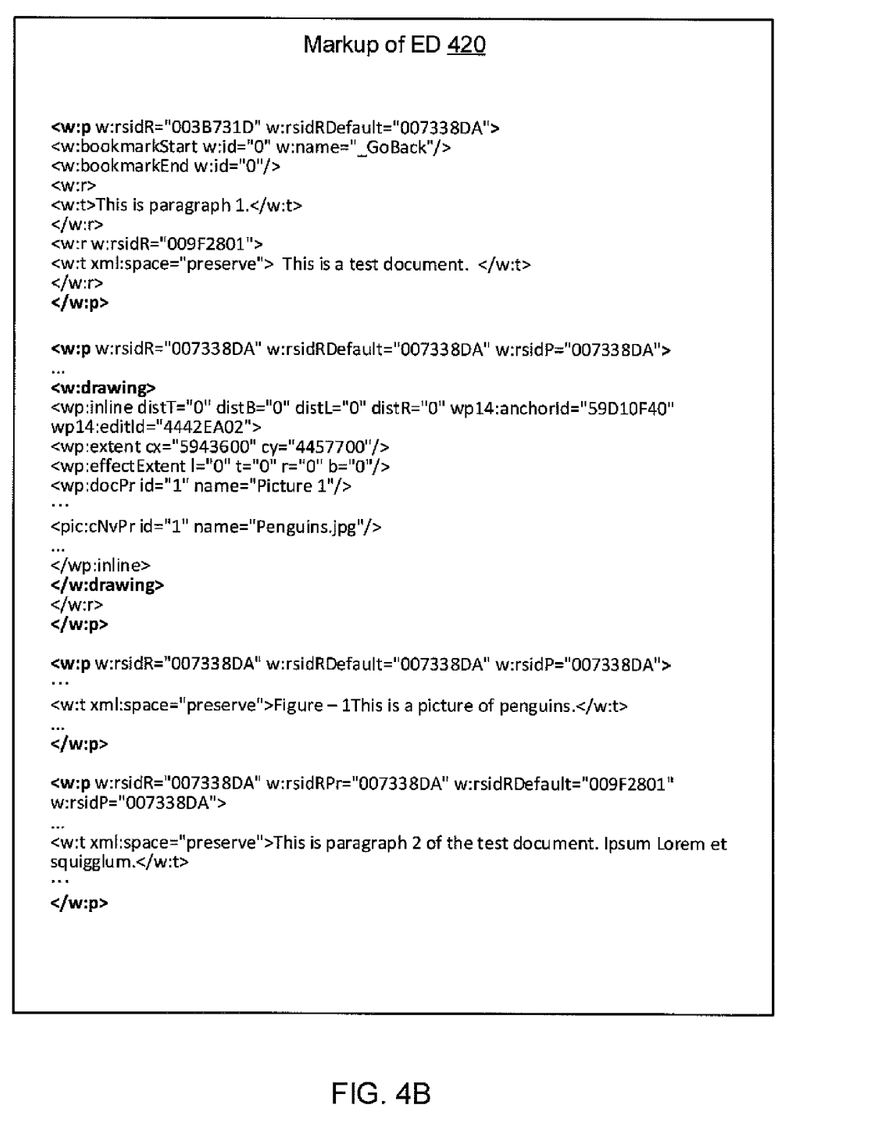

Initially, the receiver (104) may receive an input ED (150) from a remote system via a network (Step 202). The received input ED (150) may be stored on a local storage device of the system (100). The input ED (150) may be defined using a markup language (e.g., OOXML, ODF). FIGS. 4A and 4B show an example of the input ED (150). FIG. 4A shows the input ED as displayed (400) with five contents including four paragraphs and one drawing included in one of the paragraphs, and FIG. 4B shows markup of the input ED (420), which includes a "w:p" element for a paragraph and a "w:drawing" element for a drawing.

In Step 204, the parser (106) may read the input ID from the local storage device of the system (100).

In Step 206, the parser (106) may specify a predetermined element that defines a display region in the input ED as displayed (400). In one or more embodiments, the parser (106) may specify a plurality of predetermined elements that define a plurality of display regions. For example, the parser (106) may locate "w:p" and "w:drawing" elements in the input ED.

In Step 208, the parser (106) may store on the date store (102) a content specified in the region in connection with the predetermined element. In the example shown in FIGS. 4A and 4B, the parser (106) may store the following contents specified by the "w:p" and "w:drawing" elements in the paragraphs:

"This is paragraph 1. This is a test document." (Paragraph)

Penguins.jpg (Drawing in Paragraph)

"FIG. 1 This is a picture of penguins." (Paragraph)

"This is paragraph 2 of the test documents." (Paragraph)

In this example, the parser (106) may store the drawing "Penguins.jpg" specified by the "w:drawing" element. In this case, the display region for the drawing is included within the paragraph region.

Figure 3:
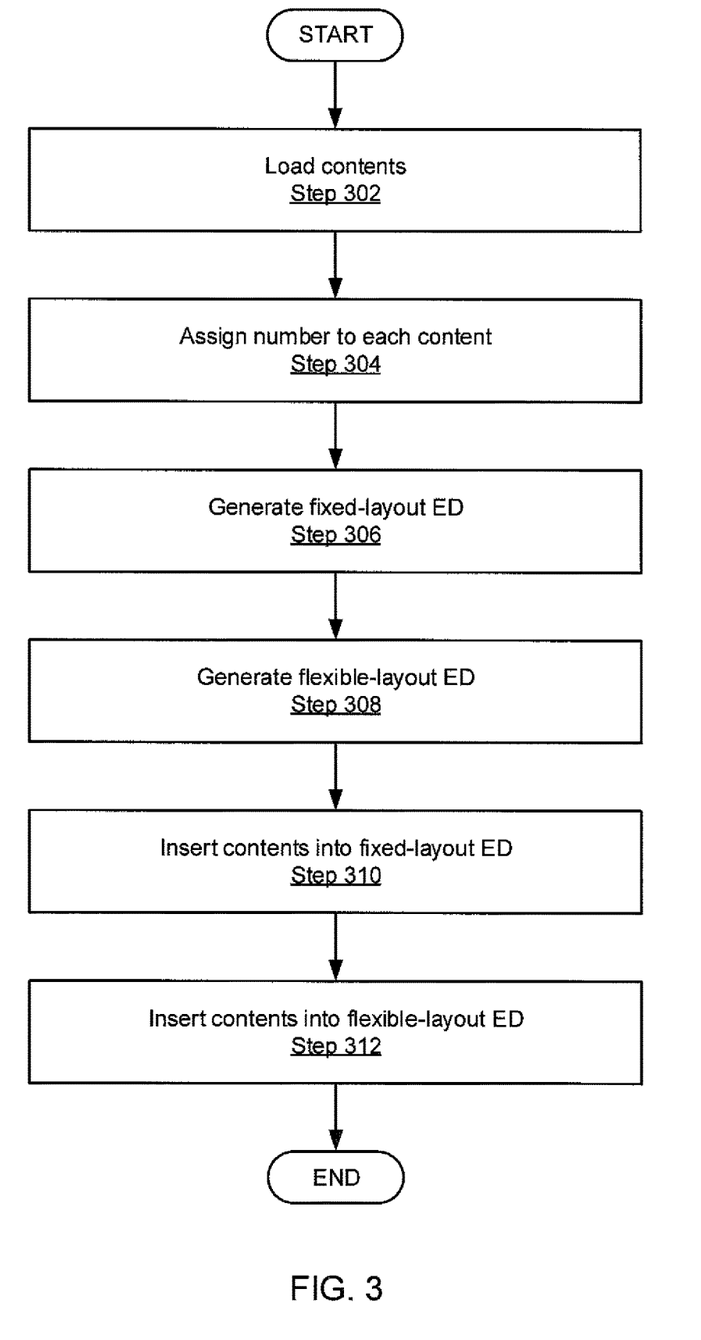
FIG. 3 shows a flowchart in accordance with one or more embodiments of the invention.

In Step 210, the generator (108) may output a fixed-layout ED and a flexible-layout ED. The generator (108) may store both EDs on the local storage device of the system (100). FIG. 3 provides additional details regarding Step 210 (discussed further below).

In Step 212, the transmitter (110) may send either or both of the generated EDs to a remote system.

In one or more embodiments of the invention, the data store (102) may store the content in connection with the element in any format. For example, the content and the element are stored in a database. The element is not necessarily associated with the actual tags or commands directly. The database may have internal attributes that correspond to the element so that the generator (108) can identify the type of the content, and generate a proper tag in each of the fixed-layout and flexible-layout EDs.

In one or more embodiments of the invention, the parser (106) may execute Steps 204 and 206 in parallel. For example, the parser (106) may start parsing from the first line of the input ED, and when the parser (106) finds a predetermined element, the parser (106) may store the content on the data store (102). Then, the parser (106) may repeat the same process for subsequent lines.

In one or more embodiments of the invention, Step 202 may be omitted, and the local storage device of the system (100) may store an input ED in advance. In one or more embodiments of the invention, Step 212 may be omitted, and the generated ED may be stored on the local storage device of the system (100).

In one or more embodiments of the invention, the transmitter (110) may receive a request from a remote system (e.g., a user device such as a PC, a smartphone, a tablet, etc.) via a network, and send the fixed-layout ED and/or the flexible-layout ED to the remote system. The remote system may display the EDs via a web browser, and allow a user of the remote system to switch the EDs depending on his preference.

FIG. 3 shows a flowchart in accordance with one or more embodiments of the invention. The process depicted in FIG. 3 may be used to output a fixed-layout ED and a flexible-layout ED. The process depicted in FIG. 3 may correspond to Step 210, discussed above with reference to FIG. 2. One or more of the steps in FIG. 3 may be performed by the components of the system (100), discussed above with reference to FIG. 1. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

In Step 302, the generator (108) may load the contents of the input ED (150) stored on the data store (102).

In Step 304, the generator (108) may assign a content number to each content. For example, the generator (108) may assign a sequential number to the content according to a type of the element in a page. In addition, the generator (108) may assign a page number to the content so that the content may be identified with the content number and the page number. As shown in FIGS. 4A and 4B, the input ED (150) includes five contents in a page including four paragraphs and one drawing. In this case, the generator (108) may assign the content number and the page number to each content as follows:

Page number=1, Paragraph number=1 for the first paragraph ("This is paragraph 1 . . . ");

Page number=1, Paragraph number=2 for the second paragraph (no text item);

Page number=1, Item number=1 for the first image (Penguins.jpg included the second paragraph);

Page number=1, Paragraph number=3 for the third paragraph ("FIG. 1 . . . "); and Page number=1, Paragraph number=4 for the fourth paragraph ("This is paragraph . . . ").

In one or more embodiments of the invention, a "paragraph number" is assigned to each paragraph, and an "item number" is assigned to each drawing. The paragraph number and the page number may form an ID, which identifies each content in the following format, for example:

"page_#page_number#_para_#paragraph_number#" for Paragraph; and

"page_#page_number#_item_#item_number#" for Drawing.

For example, the above-mentioned first paragraph may be identified by the ID "page_1_para_1". Similarly, the first image may be identified by the ID "page_1_item_1".

In Step 306, the generator (108) may generate a fixed-layout ED. For example, the generator (108) may generate the fixed-layout ED with an HTML format.

In Step 308, the generator (108) may generate a flexible-layout ED. For example, the generator (108) may generate the flexible-layout ED with an HTML format. At the following steps, both of the fixed-layout ED and the flexible-layout ED may be mutually linked.

Figure 5A:
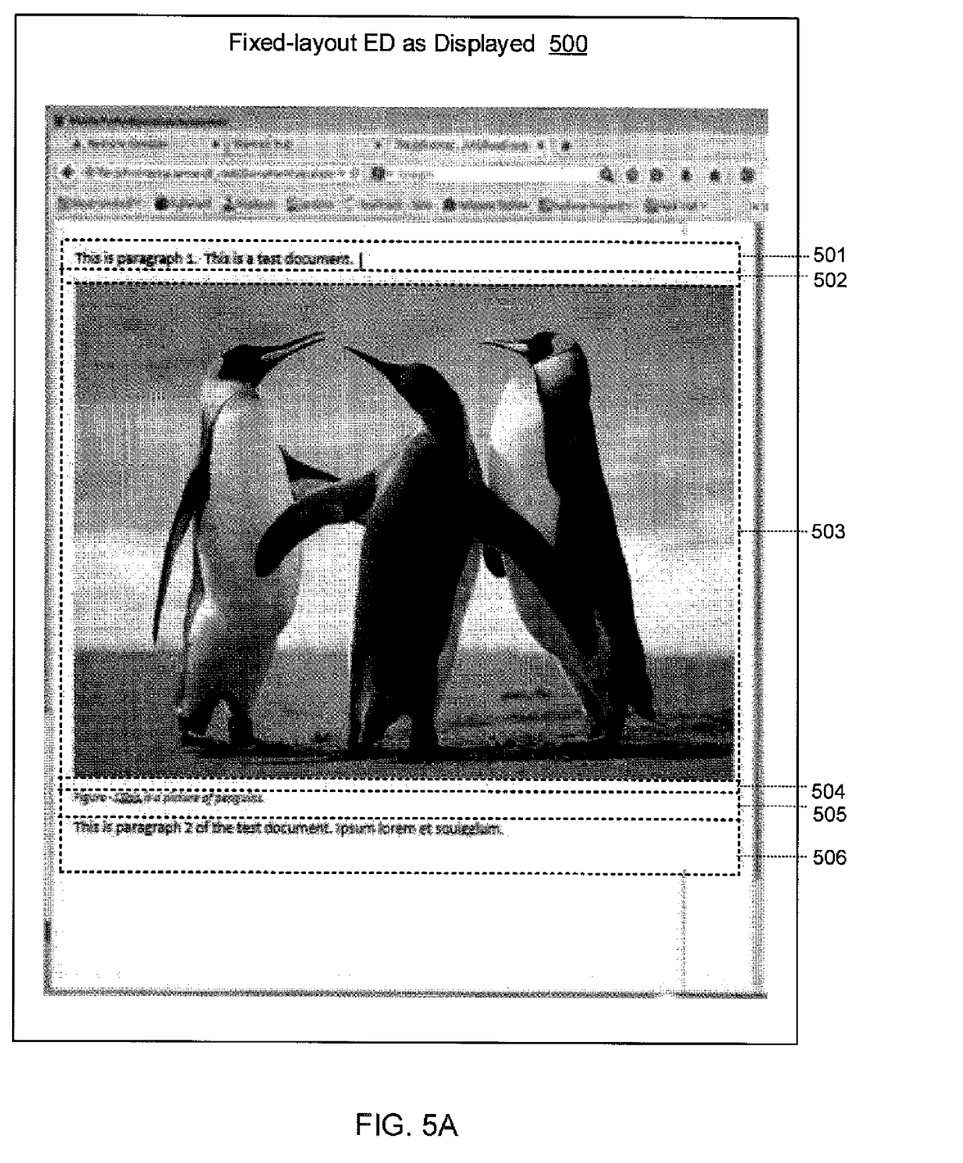

In Step 310, the generator (108) may insert the contents stored on the data store (102) into the generated fixed-layout ED. An example of the fixed-layout ED is shown in FIGS. 5A and 5B. FIGS. 5A and 5B show the fixed-layout ED as displayed (500) and markup of the fixed-layout ED (520). As shown in the fixed-layout ED as displayed (500), the appearance is similar to the input ED (150). As shown in the markup of the fixed-layout ED (520), in order to make the appearance similar, the generator (108) may determine the order of the contents, and insert the contents with SVG commands, for example.

Figure 7:
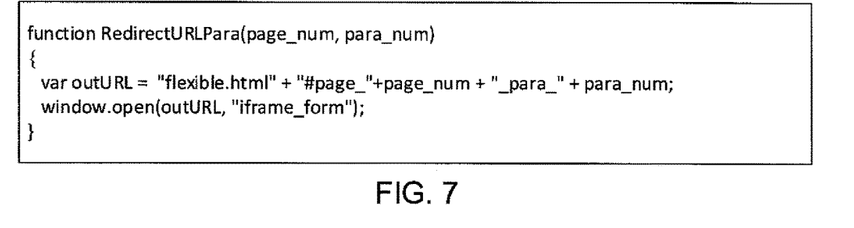
FIGS. 7-10 show sample codes in accordance with one or more embodiments of the invention.
Figure 8:
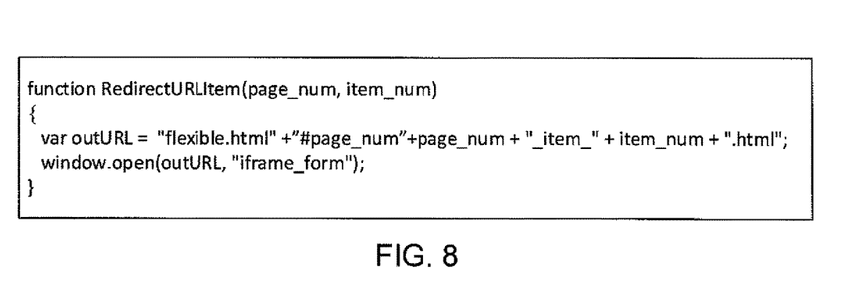

In addition, the generator (108) may set a link to each content. For example, the generator (108) may attach a hyperlink such as "a" tag of HTML to each content using the above-mentioned ID so that each content of the fixed-layout ED is hyperlinked to the position of the same content of the flexible-layout ED. For example, the hyperlink may include the ID defined in the flexible-layout ED as an anchor. As shown in FIG. 5B, Code 521 defines, using the ID "page_1_para_1" as an anchor, a link from the content included in the display region (501) of the fixed-layout ED as displayed (500) to the same content having the same ID in the flexible-layout ED. FIG. 7 shows an example of a definition of the "RedirectURLPara" function used in Code 521 to link a content included in a paragraph of the fixed-layout ED to the same content in the flexible-layout ED. FIG. 8 shows an example of definition of the "RedirectURLPara" function to link a drawing of the fixed-layout ED to the same drawing in the flexible-layout ED.

Figure 6A:
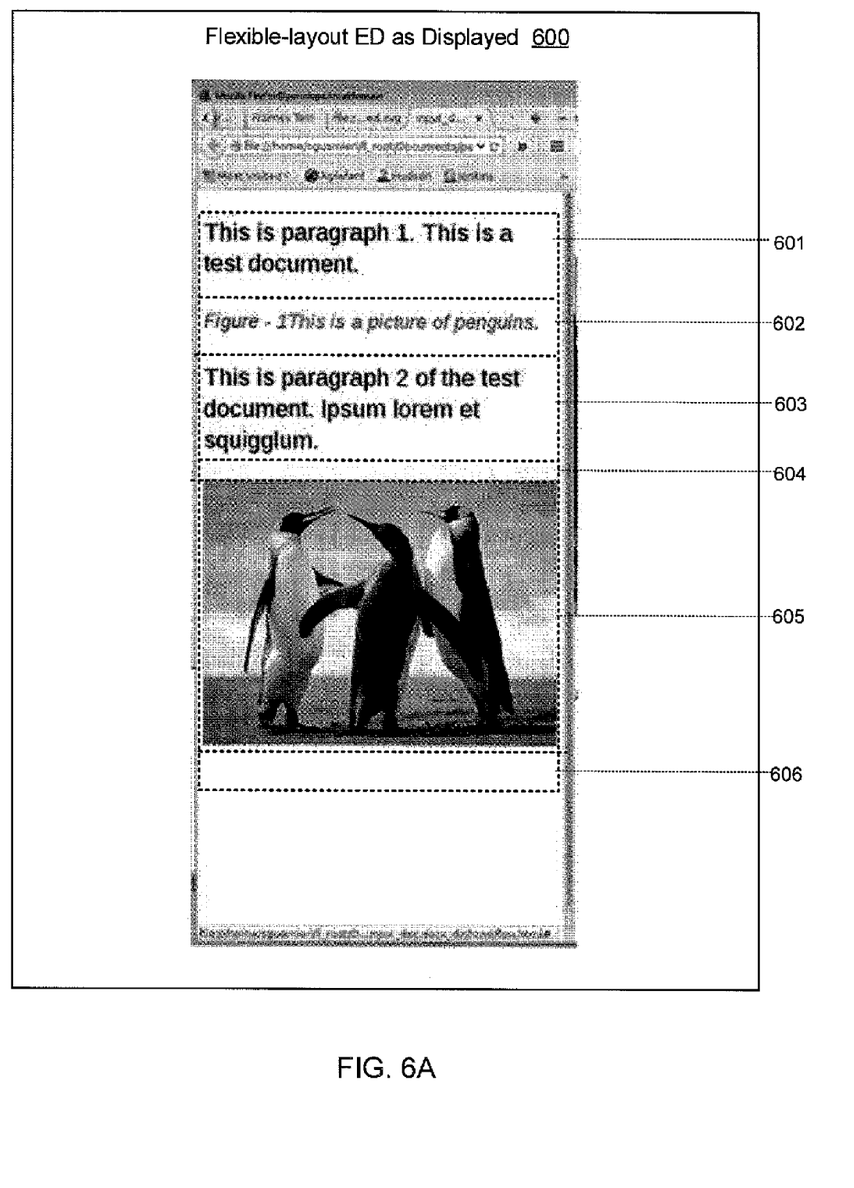

In Step 312, the generator (108) may insert the contents stored on the data store (102) into the generated flexible-layout ED. An example of the fixed-layout ED is shown in FIGS. 6A and 6B. FIGS. 6A and 6B show the flexible-layout ED as displayed (600) and markup of the flexible-layout ED (620). As shown in the flexible-layout ED as displayed (600), the appearance is different from the input ED (150). As shown in the markup of the flexible-layout ED (620), the generator (108) may determine the order of the contents in terms of the display size or other configuration of the user device that will read the flexible-layout ED, and insert the contents with text HTML commands.

Figure 9:
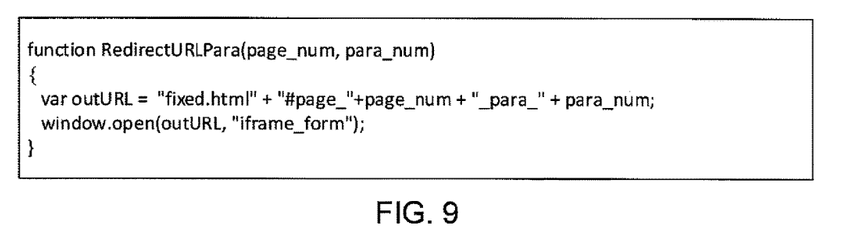
Figure 10:
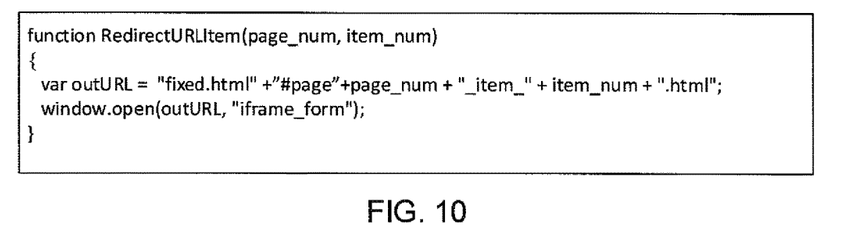

Similarly to Step 310, the generator (108) may set a link to each content in the flexible-layout ED. For example, the generator (108) may attach a link such as "a" tag of HTML to each content using the above-mentioned ID so that each content of the flexible-layout ED is linked to the position of the same content of the fixed-layout ED. As shown in FIG. 6B, Code 621 defines, using the ID "page_1_para_1" as an anchor, a hyperlink from the content included in the display region (601) of the flexible-layout ED as displayed (600) to the same content having the same ID in the fixed-layout ED. FIG. 9 shows an example of definition of the "RedirectURLPara" function used in Code 621 to link a content included in a paragraph of the flexible-layout ED to the same content in the fixed-layout ED. FIG. 10 shows an example of definition of the "RedirectURLPara" function to link a drawing of the flexible-layout ED to the same drawing in the fixed-layout ED.

In one or more embodiments of the invention, the generator (108) may execute Step 306 and Step 310 or Step 308 and Step 312 in parallel. In addition, the generator (108) may execute Step 308 and Step 312 before Step 306 and Step 310, respectively. A person of ordinary skill in the art may configure the generator (108) to execute any Step so that the generated EDs are mutually linked.

As discussed above, FIGS. 4A-6B show examples of EDs in accordance with one or more embodiments of the invention. FIGS. 4A and 4B show the input ED (150), FIGS. 5A and 5B show the generated fixed-layout ED (170), and FIGS. 6A and 6B show the generated flexible-layout ED (190). As shown in FIG. 5A, each content included in the display regions 501-506 is arranged according to the original arrangement of the input ED (150). On the other hand, as shown in FIG. 6A, each content included in the display regions 601-606 is arranged according to the display size or other configuration of the user device. For example, the user device may be a smartphone or a tablet, which has a small screen compared to a laptop or a desktop PC.

Figure 11:
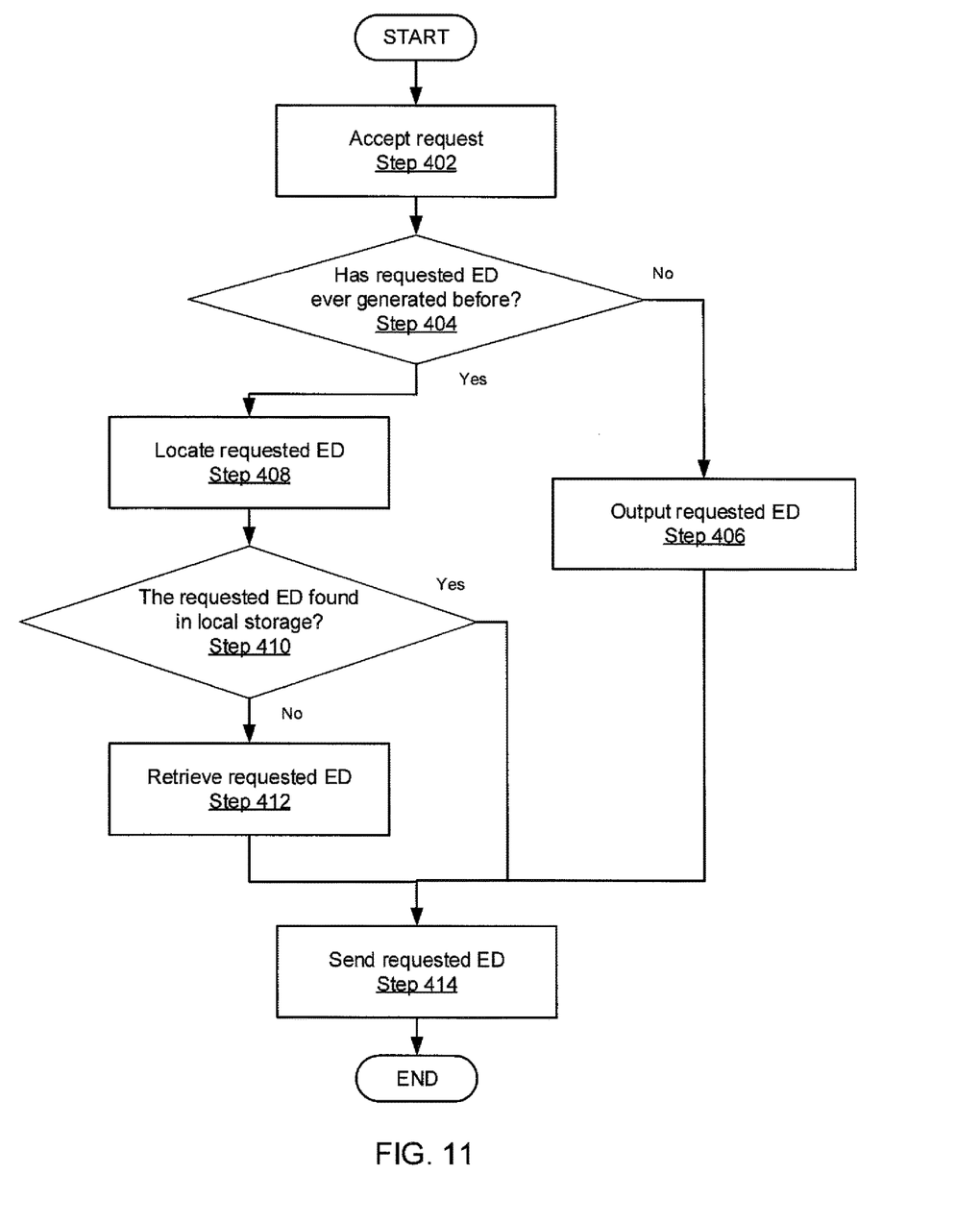
FIG. 11 shows a flowchart in accordance with one or more embodiments of the invention.

In one or more embodiments of the invention, the system 100 may output the fixed-layout ED and the flow-layout ED to a user device such as a PC, smartphone, or a tablet. FIG. 11 shows a flowchart in accordance with one or more embodiments of the invention. One or more of the steps in FIG. 11 may be performed by the components of the system (100), discussed above in reference to FIG. 1.

In Step 402, the receiver (104) may accept a request from the user device to send either a fixed-layout ED or a flexible-layout ED of a certain input ED via a network. This request may be sent by a web browser of the user device. In Step 404, responding to the receipt of the request, the generator 108 may determine whether the requested ED was ever generated in the system (100). If not, according to the processes as shown in FIGS. 3 and 4, the system (100) may output a fixed-layout ED and/or a flow-layout ED as the requested ED (Step S406). On the other hand, if the requested ED was generated before, the transmitter (110) may locate the requested ED in the local storage device (Step S408).

In Step 410, the transmitter (110) may determine whether the requested ED was found in the local storage device. If so, the transmitter (110) may send the requested ED read from the local storage device (Step S414). If not, the transmitter (110) may retrieve the requested ED from the remote storage device via a network such as the Internet (Step S412), and the transmitter (110) may send the requested ED to the user device (Step S414).

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output devices to perform one or more embodiments of the invention.

Figure 12:
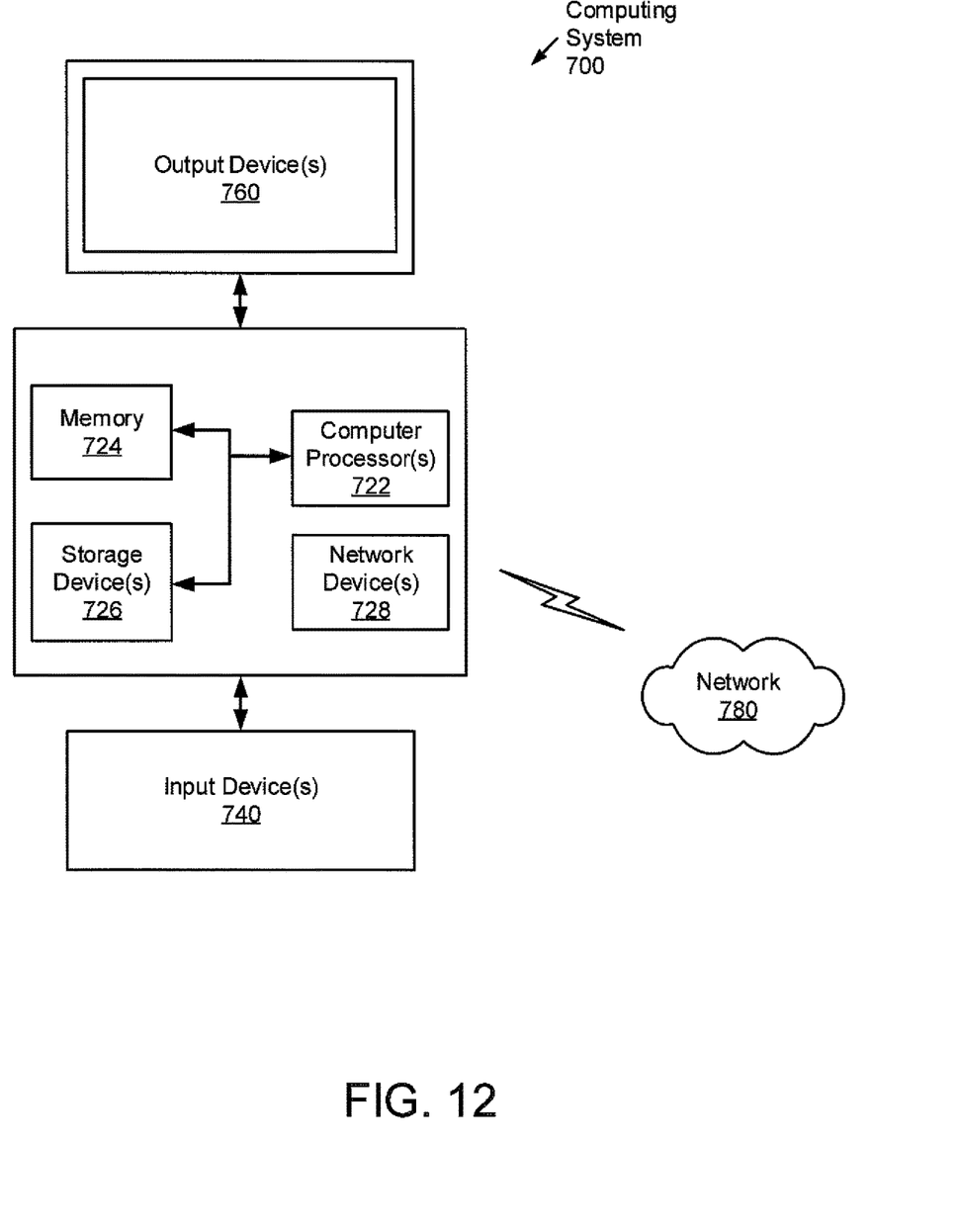
FIG. 12 shows a computer system in accordance with one or more embodiments of the invention.

For example, as shown in FIG. 12, the computing system (700) may include one or more computer processors (722), associated memory (724) (e.g., random access memory (RAM), cache memory, flash memory, etc.), one or more storage devices (726) (e.g., a hard disk, an optical drive such as a compact disk (CD) drive or digital versatile disk (DVD)

drive, a flash memory stick, etc.), a network device (728) (e.g., a network interface card, a wireless LAN module, a wide area network module, a Bluetooth module, a ZigBee module, an infra-red communication module, etc.) and numerous other elements and functionalities.

The computer processor (722) may be an integrated circuit for processing instructions. For example, the computer processor may be one or more cores, or micro-cores of a processor. The computing system (700) may also include one or more input devices (740), such as a touchscreen, keyboard, mouse, microphone, touchpad, electronic pen, or any other type of input device. Further, the computing system (700) may include one or more output devices (760), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input devices. The computing system (700) may be connected to a network (780) (e.g., a local area network (LAN), a wide area network (WAN) such as the Internet, mobile network, or any other type of network) via a network interface connection (not shown). The input and output devices may be locally or remotely (e.g., via the network (780)) connected to the computer processor (722), memory (724), and storage device (726). Many different types of computing systems exist, and the aforementioned input and output devices may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor, is configured to perform embodiments of the invention.

Further, one or more elements of the aforementioned computing system (700) may be located at a remote location and connected to the other elements over a network (780). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

According to one embodiment of the invention, two versions of an ED (i.e., a fixed-layout ED and a flexible-layout ED) may be generated. A user can change between two modes of viewing the ED. The fixed-layout ED may retain contextual fidelity, and the flexible-layout ED may maximize readability. The changing between two modes may retain the user's position in the ED, thereby preventing the need to search for the same place in the text.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating electronic documents (EDs), comprising:
    reading, from storage, an input ED comprising an element selected from a group consisting of a paragraph and an image;
    generating an identification (ID) for the element;
    storing the ID with the element;
    generating a fixed-layout ED having a markup comprising:
        the ID;
        the element; and
        a first linking function that opens a window with a flexible-layout ED at a position of the element in the flexible-layout ED,
        wherein the first linking function inputs a portion of the ID, and
        wherein the first linking function is triggered by a user selection of the element in the fixed-layout ED;
    generating the flexible-layout ED having a markup comprising:
        the ID;
        the element; and
        a second linking function that opens a window with the fixed-layout ED at a position of the element in the fixed-layout ED,
        wherein the second linking function inputs the portion of the ID, and
        wherein the second linking function is triggered by a user selection of the element in the flexible-layout ED; and
    outputting one or both of the fixed-layout ED and the flexible-layout ED to a user device.

2. The method of claim 1, wherein the ID comprises an element number and a page number.

3. The method of claim 1, wherein the input ED has an XML-based file format, and the element is specified in the input ED using a tag.

4. The method of claim 3, wherein the input ED has a file format selected from a group of Open Office XML (OOXML) and Open Document Format (ODF), and the fixed-layout ED and the flexible-layout ED have a file format that is HyperText Markup Language (HTML).

5. The method of claim 4, wherein the fixed-layout ED is generated using Scalable Vector Graphics commands, and the flexible-layout ED is generated using HTML text commands.

6. The method of claim 1, wherein the outputting of one or both of the fixed-layout ED and the flexible-layout ED to the user device comprises:
    accepting from the user device a request to output one or both of the fixed-layout ED and the flexible-layout ED via a network; and
    outputting one or both of the fixed-layout ED and the flexible-layout ED to the user device based on the request.

7. The method of claim 1, wherein the one or both of the fixed-layout ED and the flexible-layout EDs are stored at different locations over a network.

8. The method of claim 6, further comprising:
    retrieving the fixed-layout ED or the flexible-layout ED stored at a remote location via the network.

9. A system for generating electronic documents (EDs), comprising:
    a memory storing an input ED comprising an element selected from a group consisting of a paragraph and an image;

a computer processor connected to the memory that:
  reads the input ED from the memory;
  generates an identification (ID) for the element
  generates a fixed-layout ED having a markup comprising:
    the ID;
    the element; and
    a first linking function that opens a window with a flexible-layout ED at a position of the element in the flexible-layout ED,
    wherein the first lining function inputs a portion of the ID, and
    wherein the first linking function is triggered by a user selection of the element in the fixed-layout ED; and
  generates the flexible-layout ED having a markup comprising:
    the ID;
    the element; and
    a second linking function that opens a window with the fixed-layout content ED at a position of the element in the fixed-layout ED,
    wherein the second linking function inputs the portion of the ID, and
    wherein the second linking function is triggered by a user selection of the element in the flexible-layout ED,
  wherein one or both of the fixed-layout ED and the flexible-layout ED are output to a user device.

10. The system of claim 9, wherein the ID comprises an element number and a page number.

11. The system of claim 9, wherein the input ED has an XML-based file format, and the element is specified in the input ED using a tag.

12. The system of claim 11, wherein the input ED has a file format selected from a group of Open Office XML (OOXML) and Open Document Format (ODF), and the fixed-layout ED and the flexible-layout ED have a file format that is HyperText Markup Language (HTML).

13. The method of claim 12, wherein the fixed-layout ED is generated using Scalable Vector Graphics commands, and the flexible-layout ED is generated using HTML text commands.

14. The system of claim 9, wherein the processor also:
  accepts from the user device a request to output one or both of the fixed-layout ED and the flexible-layout ED via a network; and
  outputs one or both of the fixed-layout ED and the flexible-layout ED to the user device based on the request.

15. The system of claim 9, wherein: the fixed-layout ED and the flexible-layout ED are stored at different locations over a network.

16. The system of claim 14, wherein: the receiver retrieves the fixed-layout ED or the flexible-layout ED stored at a separate location via the network.

17. A non-transitory computer readable medium (CRM) storing computer program code executed by a computer processor that:
  reads, from storage, an input ED from storage comprising an element selected from a group consisting of a paragraph and an image;
  generates an identification (ID) for the element;
  stores the ID with the element;
  generates a fixed-layout ED having a markup comprising:
    the ID;
    the element; and
    a first linking function that opens a window with a flexible-layout ED at a position of the element in the flexible-layout ED,
    wherein the first linking function inputs a portion of the ID, and
    wherein the first linking function is triggered by a user selection of the element in the fixed-layout ED;
  generates the flexible-layout ED having a markup comprising:
    the ID;
    the element; and
    a second linking function that opens a window with the fixed-layout ED at a positions of the element in the fixed-layout ED,
    wherein the second linking function inputs the portion of the ID, and
    wherein the second linking function is triggered by a user selection of the element in the flexible-layout ED; and
  outputs one or both of the fixed-layout ED and the flexible-layout ED to a user device.

18. The non-transitory CRM of claim 17, wherein ID comprises an element number and a page number.

19. The non-transitory CRM of claim 17, wherein the input ED has an XML-based file format, and the element is specified in the input ED using a tag.

20. The non-transitory CRM of claim 17, wherein the input ED has a file format selected from a group of Open Office XML (OOXML) and Open Document Format (ODF), and the fixed-layout ED and the flexible-layout ED have a file format that is HyperText Markup Language (HTML).

* * * * *